US009574676B2

(12) United States Patent
Laboda et al.

(10) Patent No.: US 9,574,676 B2
(45) Date of Patent: Feb. 21, 2017

(54) HIGH-TEMPERATURE AND HIGH-VIBRATION CAPABLE ARMATURE ASSEMBLIES FOR TORQUE MOTOR VALVE ACTUATORS

(71) Applicant: HONEYWELL INTERNATIONAL INC., Morristown, NJ (US)

(72) Inventors: Donna Laboda, Niles, MI (US); Matt Arend, South Bend, IN (US); David Druhan, South Bend, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 30 days.

(21) Appl. No.: 14/603,894

(22) Filed: Jan. 23, 2015

(65) Prior Publication Data

US 2016/0215898 A1    Jul. 28, 2016

(51) Int. Cl.
| | | |
|---|---|---|
| F15B 13/043 | (2006.01) | |
| F16K 31/06 | (2006.01) | |
| F16K 1/18 | (2006.01) | |
| H01F 7/14 | (2006.01) | |
| H01F 7/121 | (2006.01) | |
| F16F 1/14 | (2006.01) | |

(52) U.S. Cl.
CPC .............. *F16K 31/06* (2013.01); *F16K 1/18* (2013.01); *F16K 31/0682* (2013.01); *H01F 7/121* (2013.01); *H01F 7/14* (2013.01); *F16F 1/14* (2013.01); *Y10T 137/86598* (2015.04)

(58) Field of Classification Search
CPC ............... Y10T 137/86598; Y10T 137/86815; Y10T 137/86831

USPC .................... 267/154, 155, 158, 160; 310/29
See application file for complete search history.

(56) References Cited

U.S. PATENT DOCUMENTS 2,767,689 A * 10/1956 Moog, Jr. ........... F15B 13/0438
                                                        137/625.62
2,924,241 A *  2/1960 Bauer ................. F15B 13/0431
                                                        137/549
(Continued)

FOREIGN PATENT DOCUMENTS

DE          909658 C      4/1954
DE       3323982 A1      1/1985
(Continued)

OTHER PUBLICATIONS

Extended EP Search Report for Application No. 15150221.8-1809/2894774 dated Apr. 18, 2016.
(Continued)

*Primary Examiner* — R. K. Arundale
(74) *Attorney, Agent, or Firm* — Lorenz & Kopf, LLP

(57) ABSTRACT

Armature springs configured to be coupled to and bias an armature of a torque motor valve actuator to a null position are provided. The armature spring comprises a rigid central portion, opposed end portions, and a flexible portion intermediate the rigid central portion and each end portion. The rigid central portion, the opposed end portions, and the flexible portions define a variable cross section torsion bar with the flexible portions comprising reduced cross-sectional portions of the torsion bar relative to the rigid central portion and opposed end portions. Armature assemblies and torque motor valve actuators are also provided.

19 Claims, 3 Drawing Sheets

(56) References Cited

U.S. PATENT DOCUMENTS

| | | | |
|---|---|---|---|
| 2,962,611 A * | 11/1960 | Atchley | H01F 7/14 310/29 |
| 3,081,787 A | 3/1963 | Meulendyk | |
| 3,103,603 A | 9/1963 | Reutter | |
| 3,209,782 A | 10/1965 | Wolpin et al. | |
| 3,323,090 A | 5/1967 | O'Brien | |
| 3,377,882 A | 4/1968 | Schrempp | |
| 3,517,359 A | 6/1970 | Trbovich et al. | |
| 3,777,784 A * | 12/1973 | Nicholson | F15B 13/0431 137/625.62 |
| 3,878,412 A | 4/1975 | Kurpanek | |
| 3,910,314 A | 10/1975 | Nicholson | |
| 3,938,778 A * | 2/1976 | Hansen | H01F 7/14 251/129.15 |
| 4,362,182 A * | 12/1982 | Sjolund | F15B 13/0438 137/625.64 |
| 4,378,031 A | 3/1983 | Nicholson et al. | |
| 4,403,204 A * | 9/1983 | Crawshaw | H01F 7/14 335/229 |
| 4,527,772 A | 7/1985 | Kebede et al. | |
| 4,560,969 A | 12/1985 | Nicholson | |
| 4,794,941 A | 1/1989 | Godon | |
| 4,796,664 A * | 1/1989 | Toews | H01F 7/08 137/595 |
| 4,997,002 A | 3/1991 | Blatter et al. | |
| 5,184,645 A | 2/1993 | Boerschig | |
| 5,465,757 A | 11/1995 | Peters | |
| 5,687,960 A | 11/1997 | Moon | |
| 5,697,401 A | 12/1997 | Shinoda et al. | |
| 6,246,131 B1 | 6/2001 | Sheng | |
| 6,321,767 B1 | 11/2001 | Seid et al. | |
| 6,791,442 B1 | 9/2004 | Schmidt | |
| 6,974,117 B2 | 12/2005 | Dzialakiewicz et al. | |
| 7,795,538 B2 | 9/2010 | Kaiser et al. | |
| 8,485,201 B2 | 7/2013 | Wyatt et al. | |
| 8,505,573 B2 | 8/2013 | Herbert et al. | |
| 8,572,838 B2 | 11/2013 | Piascik et al. | |
| 9,328,839 B2 | 5/2016 | Arend et al. | |
| 2004/0056048 A1 * | 3/2004 | Kaartinen | G01F 11/086 222/214 |
| 2006/0273539 A1 | 12/2006 | Barth et al. | |
| 2008/0116882 A1 | 5/2008 | Taylor et al. | |
| 2010/0156580 A1 | 6/2010 | Bill et al. | |
| 2013/0048891 A1 | 2/2013 | Druhan et al. | |

FOREIGN PATENT DOCUMENTS

| | | |
|---|---|---|
| DE | 20000397 U1 | 4/2000 |
| GB | 2142780 A | 1/1985 |

OTHER PUBLICATIONS

USPTO Office Action, Notification Date Sep. 17, 2015; U.S. Appl. No. 14/150,139.

Liu, Chein-Shan; Elastic Torsion Bar with Arbitrary Cross-Section Using the Fredholm Integral Equations; CMC, vol. 5, No. 1, pp. 31-42, 2007; Copyrightc 2007 Tech Science Press.

Extended EP Search Report for Application No. 16151578.8-1751 dated Jun. 9, 2016.

\* cited by examiner

HIGH-TEMPERATURE AND HIGH-VIBRATION CAPABLE ARMATURE ASSEMBLIES FOR TORQUE MOTOR VALVE ACTUATORS

TECHNICAL FIELD

The present invention generally relates to torque motor valve actuators, and more particularly relates to high-temperature and high-vibration capable armature assemblies for torque motor valve actuators of valve assemblies.

BACKGROUND

Torque motor valve actuators are used in myriad systems and environments. For example, many engine air valves associated with an aircraft gas turbine engine are controlled using torque motor valve actuators. No matter the specific end-use system and environment, a conventional torque motor valve actuator includes a plurality of coils, an armature, and a flapper. The coils are controllably energized to control the rotational position of the armature, which is coupled to a valve element, such as a flapper. By controlling the rotational position of the armature, the position of the flapper relative to one or more fluid outlets is controlled and thus fluid pressure and/or flow to a fluid controlled device is controlled.

In many instances, aircraft engine air valves are mounted near the engine. Due to the relatively high temperatures near the engine, the torque motor valve actuators associated with the engine air valves are remotely mounted. This remote mounting can increase the overall cost and complexity of the system. High temperature environments directly impact the power requirements of the torque motor. As the temperature increases, coil resistance increases resulting in increased power demands and higher internal power dissipation. Moreover, because of the high temperatures, conventional vibration damping sources such as rubber O-rings, etc. cannot be used, or used reliably. If there is no or insufficient damping, the valve assemblies and parts thereof (including a torque motor valve actuator and armature assembly) are subject to vibration-induced stresses and may therefore break during operation.

Hence, there is a need for armature assemblies for torque motor valve actuators that can operate in relatively high temperatures and high vibration environments and can be mounted directly to the air valves. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Armature springs configured to be coupled to and bias an armature of a torque motor valve actuator to a null position are provided in accordance with exemplary embodiments of the present invention. The armature spring comprises a rigid central portion, opposed end portions, and a flexible portion intermediate the rigid central portion and each end portion. The rigid central portion, the opposed end portions, and the flexible portions define a variable cross section torsion bar with the flexible portions comprising reduced cross-sectional portions of the torsion bar relative to the rigid central portion and opposed end portions.

Armature assemblies are provided in accordance with yet another exemplary embodiment of the present invention. The armature assembly is for a torque motor valve actuator including an actuator housing. The armature assembly comprises an armature and an armature spring coupled to and extending generally perpendicularly through the armature. The armature spring is configured to bias the armature to a null position in the torque motor valve actuator. The armature spring comprises a torsion bar having a variable cross-section defined by a rigid central portion, opposed end portions, and a flexible portion intermediate the rigid central portion and each end portion. The flexible portions comprise reduced cross-sectional portions of the torsion bar.

Torque motor valve actuators are provided in accordance with yet another exemplary embodiment of the present invention. The torque motor valve actuator comprises a first magnetic pole piece of a first magnetic polarity, a second magnetic pole piece of a second magnetic polarity, an armature assembly, and a coil surrounding at least a portion of the armature and adapted to receive electric current and configured, upon receipt thereof, to generate a magnetic force that causes the armature to rotate. The second magnetic pole piece is spaced apart from the first magnetic pole piece to define a gap. The armature assembly comprises a rotationally mounted armature disposed in the gap between the first and second magnetic pole pieces and an armature spring coupled to and extending generally perpendicularly through the armature. The armature spring is configured to bias the armature to a null position. The armature spring comprises a torsion bar having a variable cross-section defined by a rigid central portion, opposed end portions, and a flexible portion intermediate the rigid central portion and each end portion. The flexible portions comprise reduced cross-sectional portions of the torsion bar.

Furthermore, other desirable features and characteristics of the armature spring, armature assembly, and torque motor valve actuator will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to high-temperature and high-vibration capable armature assemblies for torque motor valve actuators of valve assemblies. The armature assembly according to exemplary embodiments of the present invention as herein described provides a relatively low armature torsional rate at high temperatures (e.g., greater than 800° Fahrenheit (F) while also being able to withstand high vibration environments (225 G harmonic response input the base of the torque motor) (i.e., the armature assembly is "high-temperature and high-vibration capable"). The armature assembly generally comprises an armature optimized for mass balance and flux carrying capacity and an armature spring comprising a variable cross-section torsion bar that provides a desired functional stiffness, functional stress, and resonance frequencies above 2000 Hertz (Hz) (or as high as possible) for all modes, except the primary torsional mode, such that vibration-induced stresses are reduced or substantially eliminated, thereby substantially preventing structure breakage and compensating for the lack of damping sources in the structure. As used herein, the term "functional stiffness" means the stiffness required to counteract the magnetic forces imparted on the armature assembly. The term "functional stress" means the stress incurred during actuation of the armature assembly.

Figure 1:
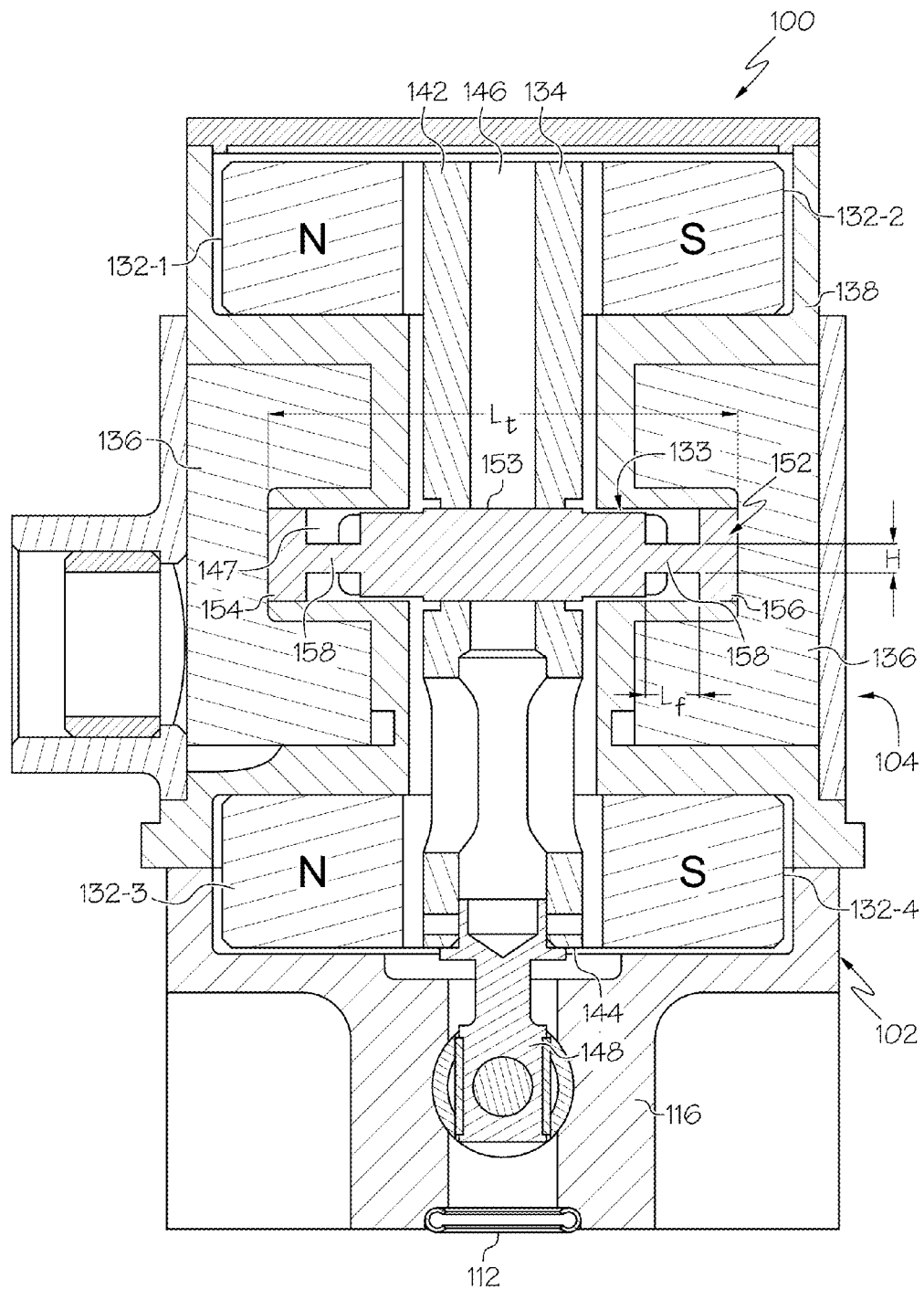
FIG. 1 is a cross-sectional partial view of a valve assembly including a torque motor valve actuator according to exemplary embodiments of the present invention.
Figure 2:
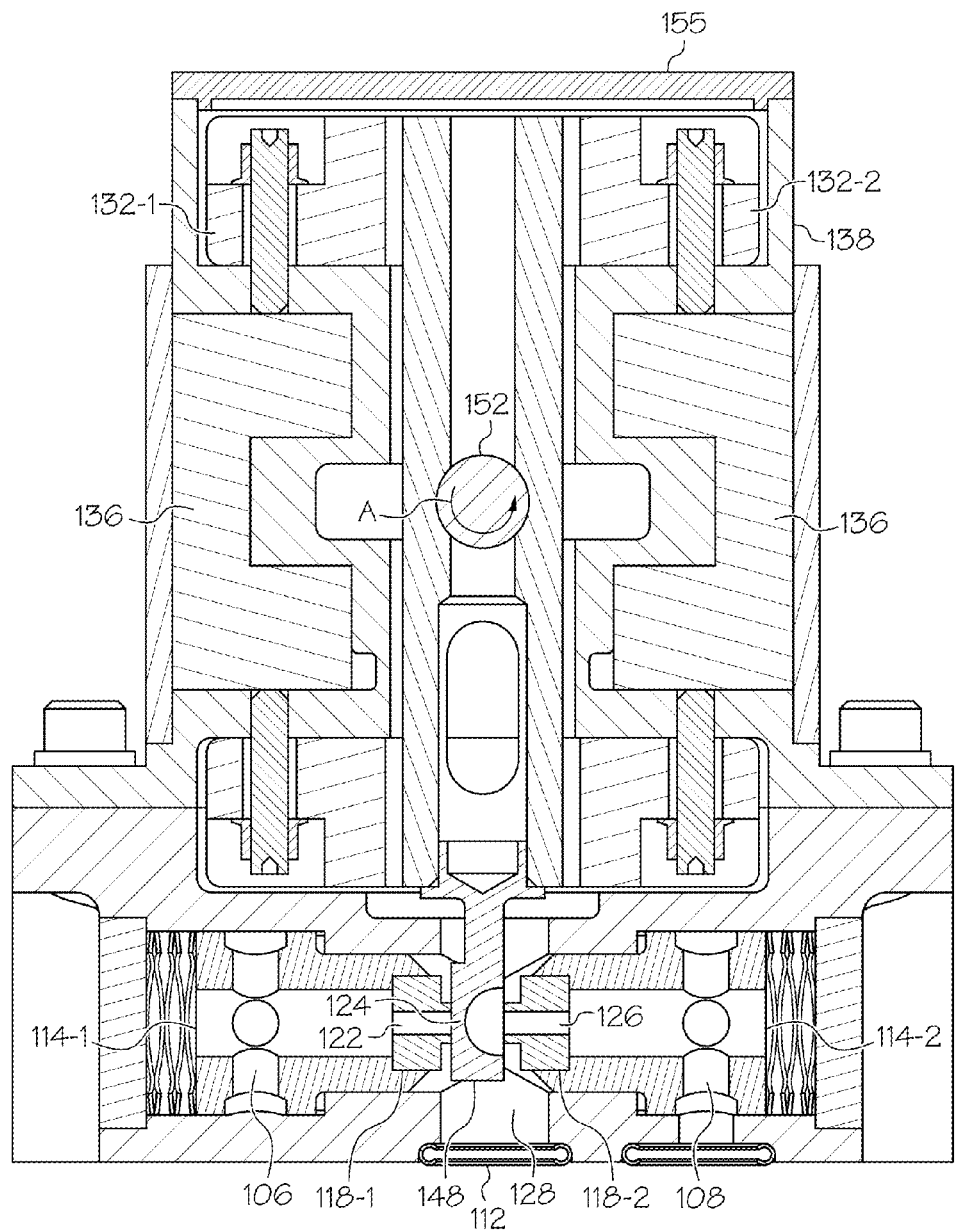
FIG. 2 is another cross-sectional view of the valve assembly of FIG. 1 including the torque motor valve actuator and a nozzle assembly (partially shown in FIG. 1)

Referring to FIGS. 1 and 2, in accordance with exemplary embodiments of the present invention, a cross section view of one embodiment of a valve assembly 100 is depicted. The depicted valve assembly 100 is a single-stage electro-hydraulic servo-valve (EHSV) and includes a valve housing 102 and a torque motor valve actuator 104. The valve housing 102 includes a first housing inlet 106, a second housing inlet 108, and a housing outlet 112. The first housing inlet 106 and the second housing inlet 108 are each adapted to be coupled in fluid communication with a pressurized fluid source (not illustrated). It will be appreciated that the pressurized fluid medium may vary, and may be any one of numerous gaseous or liquid media. The housing outlet 112 is adapted to be coupled in fluid communication with a pressurized fluid load, such as, for example, a pneumatic or hydraulic valve, or simply be vented to atmosphere.

Referring now specifically to FIG. 2, the valve housing 102 additionally includes two nozzle cavities—a first nozzle cavity 114-1 and a second nozzle cavity 114-2—and a flapper plenum 116. The first nozzle cavity 114-1 is in fluid communication with the first housing inlet 106 and the flapper plenum 116, and the second nozzle cavity 114-2 is in fluid communication with the second housing inlet 108 and the flapper plenum 116. The flapper plenum 116, which is disposed perpendicular to the first and second nozzle cavities 114-1, 114-2, is in fluid communication with the housing outlet 112.

Two nozzles 118, which are referred to herein as a first nozzle 118-1 and a second nozzle 118-2, are mounted within the housing 102. More specifically, the first nozzle 118-1 is mounted within the first nozzle cavity 114-1, and the second nozzle 118-2 is mounted within the second nozzle cavity 114-2. The first nozzle 118-1 includes a first nozzle inlet 122 and a first nozzle outlet 124, and the second nozzle 118-2 includes a second nozzle inlet 126 and a second nozzle outlet 128. The first nozzle 118-1 is configured such that the first nozzle inlet 122 is in fluid communication with the first housing inlet 106, and the first nozzle outlet 124 is disposed within the flapper plenum 116. The second nozzle 118-2 is configured such that the second nozzle inlet 126 is in fluid communication with the second housing inlet 108, and the second nozzle outlet 128 is disposed within the flapper plenum 116. Fluid flow through the first and second nozzles 118-1, 118-2, into the flapper plenum 116, and out the housing outlet 112 is controlled via the torque motor valve actuator 104, an embodiment of which will now be described.

The torque motor valve actuator 104 is coupled to the valve housing 102 and is adapted to be selectively energized. The torque motor valve actuator 104 is configured, upon being selectively energized, to selectively place the housing outlet 112 in fluid communication with either or both of the first nozzle outlet 124 and the second nozzle outlet 128. In the depicted embodiment, the torque motor valve actuator 104 includes a first magnetic pole piece 132-1, a second magnetic pole piece 132-2, an armature assembly 133, and a coil 136, all of which are disposed within an actuator housing 138 (also referred to as a "bobbin"]. The armature assembly 133 comprises an armature 134 and an armature spring 152 as hereinafter described. The first and second magnetic pole pieces 132 are of opposite magnetic polarities, and are spaced apart from each other to define a gap. For example, if the first magnetic pole piece 132-1 is of a north (N) magnetic polarity, then the second magnetic pole piece 132-2 is of a south (S) magnetic polarity, and vice-versa.

It will be appreciated that the first and second magnetic pole pieces 132-1, 132-2 may be variously configured and implemented. For example, the first and second magnetic pole pieces 132-1, 132-2 may be coupled to, or form part of, a single permanent magnet. Alternatively, the first and second magnetic pole pieces 132-1, 132-2 may be coupled to, or form part of, separate magnets. For example, the first magnetic pole piece 132-1 may be coupled to, or form part of, a first permanent magnet, and the second magnetic pole piece 132-2 may be coupled to, or form part of, a second permanent magnet.

It is further noted that, at least in the depicted embodiment, the torque motor valve actuator 104 additionally includes third and fourth magnetic pole pieces 132-3, 132-4. The third and fourth magnetic pole pieces 132-3, 132-4 are also of opposite magnetic polarities, and are also spaced apart from each. Thus, like the first and second magnetic pole pieces 132-1, 132-2, if the third magnetic pole piece 132-3 is of a north (N) magnetic polarity, then the fourth magnetic pole piece 132-4 is of a south (S) magnetic polarity, and vice-versa.

It will be additionally be appreciated that the third and fourth magnetic pole pieces 132-3, 132-4, like the first and second magnetic pole pieces 132-1, 132-2, may be variously configured and implemented. For example, the third and fourth magnetic pole pieces 132-3, 132-4 may be coupled to, or form part of, a single permanent magnet. Alternatively, the third and fourth magnetic pole pieces 132-3, 132-4 may be part of separate magnets. For example, the third magnetic pole piece 132-3 may be coupled to, or form part of, a third permanent magnet, and the fourth magnetic pole piece 132-4 may be coupled to, or form part of, a fourth permanent magnet.

Regardless of the specific number, configuration, and implementation of magnetic pole pieces 132, the armature 134 is rotationally mounted and is disposed in the gap between the first and second magnetic pole pieces 132 (and the third and fourth magnetic pole pieces, if included). The depicted armature 132 includes a first end 142, a second end 144, an opening 146 that extends from the first end 142 to the second end 144, and a bore 147 that extends generally transversely through the armature. The opening 146 may alternatively extend partially into the armature 134 or not exist at all. The bore 147 may be in approximately the center of the armature for pass-through of an armature spring 152 as hereinafter described. It is to be understood that the bore may extend generally transversely through the armature in other than the center thereof. The second end 144 of the armature 134 is coupled to a flapper element 148, which is disposed in the flapper plenum 116 between the first and second nozzles 118-1, 118-2. The armature 134 characteristics are defined by the end-use system. The armature 134 is sized to carry magnetic flux generated by the coil 136.

Figure 3:
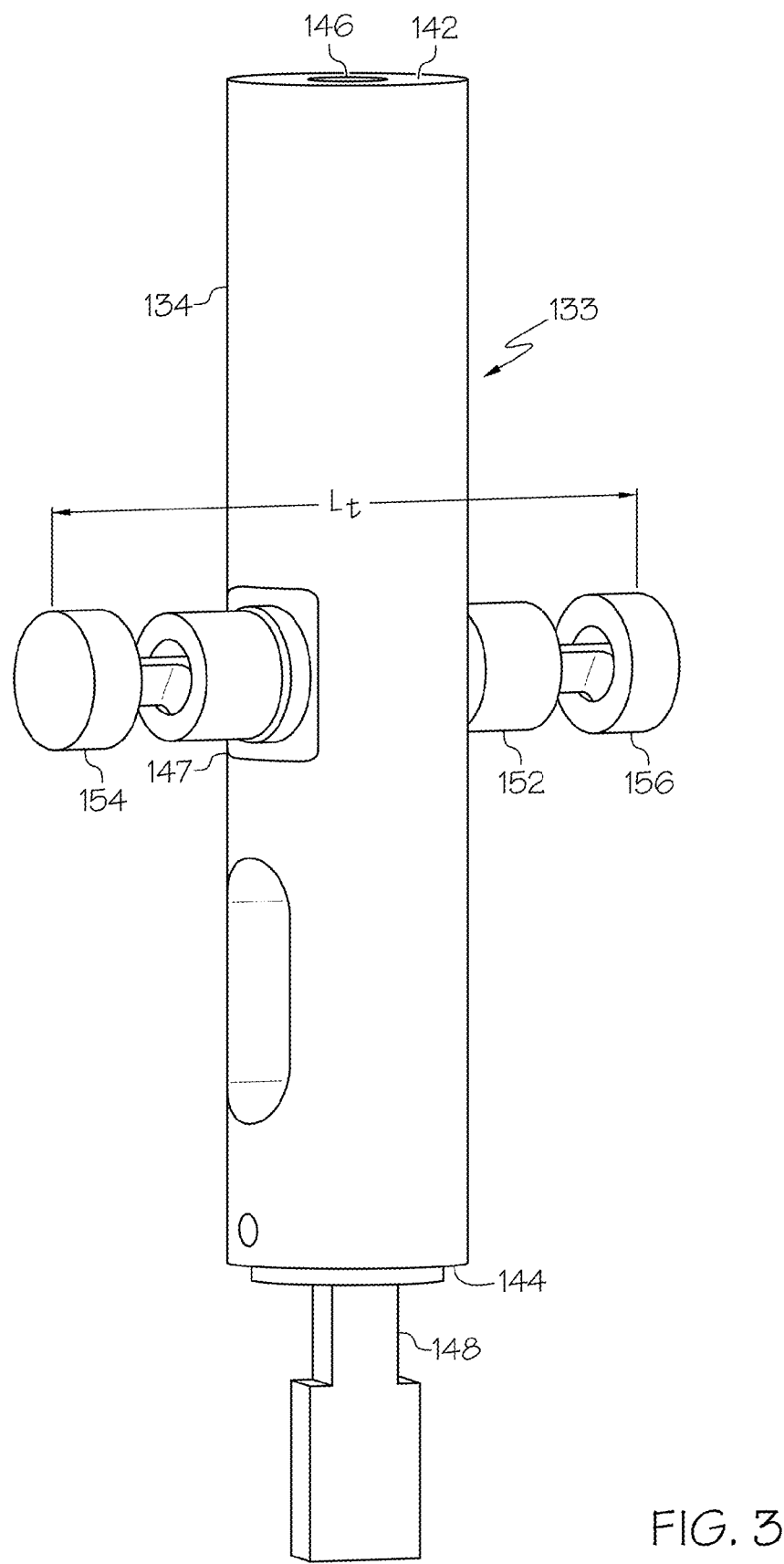
FIG. 3 is an isolation view of an armature assembly of the torque motor valve actuator of FIGS. 1 and 2, in accordance with yet another exemplary embodiment of the present invention, the armature assembly coupled to a flapper element of the nozzle assembly of FIG. 2.

Still referring to FIGS. 1 and 2 and now to FIG. 3, according to exemplary embodiments of the present invention, the armature spring 152 extends through the bore 147 and is coupled to the armature 134. The armature spring 152 may be coupled to the armature 134 by brazing or the like. The armature spring 152 is configured to bias the armature to a null position, which is the position depicted in FIG. 1. The armature spring 152 comprises a torsion bar that may be generally dumbbell-shaped overall with a variable cross-section as depicted. The torsion bar has a selected torsion bar length $L_t$ and cross section to reduce functional stress as hereinafter described.

The armature spring 152 (i.e., the torsion bar) includes a rigid central portion 153, opposed end portions (a first end portion 154 and a second end portion 156), and a flexible portion 158 intermediate the rigid central portion 153 and each of the end portions 154 and 156. The rigid central portion 153 and opposed end portions 154 and 156 have a larger outer diameter (i.e., they may be thicker or have a larger cross-section) than the flexible portions 158 to define the variable cross-sectional torsion bar. There may be different cross-sections throughout the length of the variable cross-sectional torsion bar, as long as the cross-sections generally follow a "larger-smaller-larger-smaller-larger" configuration. The rigid central portion 153 and the opposed end portions 154 and 156 have the "larger" cross-section relative to the "smaller" cross section of the flexible portions. The "larger" cross sectional portions may have the same cross-sectional shape and/or size or a different cross-sectional shape and/or size. The flexible portions comprise reduced cross-sectional portions of the torsion bar. The rigid central portion 153 and opposed end portions 154 and 156 may be generally cylindrical as depicted or may have other cross-sectional shapes that are the same or different from each other. $L_t$ is driven by the selected length of the rigid central portion 153 and the selected length of the flexible portions 158. The first and second end portions 154 and 156 are respectively fixedly coupled to the actuator housing 138 by brazing or the like. The first and second end portions 154 and 156 are sized to produce a good braze joint and have the actuator housing 138 be of appropriate thickness for structural integrity. The end portions 154 and 156 have a larger outer diameter (i.e., they may be thicker or have a larger cross-section) than the flexible portions 158 so that the functional stress and vibration-induced stress is not in the braze joints between the respective end portions and the actuator housing 138. The actuator housing 138 is configured to accommodate the armature spring.

The rigid central portion 153 desirably increases the resonance frequencies of the armature assembly 133 above 2000 Hz (or as high as possible) for all modes, except the primary resonance frequency (the primary torsional mode). At resonance frequencies above 2000 Hz, the vibration-induced stresses are minimized, thereby adjusting for the lack of a damping source. The primary resonance frequency, while below 2000 Hz, is pre-set but is sufficiently damped because of magnet interaction. Adjustment of the primary resonance frequency is limited by the overall system design which is driven by the mass of the armature 134 and stiffness of the torsion bar, which are in turn driven by the strength of the magnetics and system requirements including available current. The other resonance frequencies may be manipulated by adjustments to the mass and stiffness matrices defining structural resonance. According to exemplary embodiments of the present invention, the variable cross-section of the torsion bar allows for this manipulation while not increasing the packaging size of the armature assembly.

The flexible portions 158 are configured to twist in the direction of the arrow A of FIG. 2, to bias the armature 134 to the null position. The cross-section of the flexible portions may be any shape, such as circular, triangular, square, rectangular, and diamond. The orientation of the flexible portions 158 relative to the rigid central portion 153 of the armature spring 152 bar may be varied. The flexible portions 158 each have a selected length $L_f$, a selected height H, a selected width W (into the page), and a selected thickness (being less than the "thickness" of the rigid central portion and opposed end portions 154 and 156) for purposes as hereinafter described. The dimensions may be the same or different for both flexible portions. The flexible portions are sized to provide resonance frequencies above 2000 Hz (or as high as possible) for all modes, except the primary torsional mode. While the variable cross-sectional torsion bar has been described and depicted as one-piece, it is to be understood that the torsion bar may comprise more than one piece.

The torsion bar geometry (torsion bar length $L_t$, flexible portion length $L_f$, width (W), and height (H), and cross section) is selected to lower the armature assembly torsional rate (i.e., spring rate) in high temperature and high vibration environments, while maximizing structural integrity margins. To do so, operational requirements include a desired functional stress (e.g., below 30 ksi), a desired functional stiffness as measured by spring rate (Ka) of about 200 in-lb/rad (a high spring rate refers to deflection), and all resonance frequencies above 2000 Hz (or as high as possible) for all modes, except the primary modal frequency (i.e., the primary torsional mode). The variable cross section of the torsion bar reduces functional rate, functional stress, and vibration-induced stress. The flexible portions are sized and shaped for the desired predetermined functional stiffness and desired (i.e., acceptable) functional stress. The total length of the torsion bar is also selected for an acceptable predetermined functional stress. The rigid central portion allows for modal frequency tuning without affecting the functional stiffness. The outer diameter of the rigid central portion is selected to obtain a sufficient frequency margin for modal frequencies above the primary modal frequency. In order to move the flapper element at high temperatures, the functional stiffness needs to be low. However, a low functional stiffness may result in low modal frequencies that increase the torque motor susceptibility to vibration failures. The ability to obtain a low functional stiffness and high modal frequencies is a requirement for increased vibration capability (i.e., the ability to withstand high vibration environments).

As the armature spring 152 is at least partially disposed within the armature 134 (more particularly, the rigid central portion is partially disposed within the bore of the armature), the design allows for more flexibility to optimize for operating stresses as compared to those associated with an externally disposed spring. This configuration also allows for using a relatively smaller and more efficient armature spring design. As a result, more of the magnetic flux that is generated by the coil 136 is used by the armature 134, resulting in increased efficiency in magnetic performance and reduced power requirements. This configuration also makes it easier to include the third and fourth pole pieces 132-3, 132-4, as the base 155 of the armature 134 is mounted at the top of the actuator housing 138. This provides an increased output force for the same input current, also reducing power requirements.

The coil 136 surrounds at least a portion of the armature 134 and is disposed such that it is not surrounded by any of the magnetic pole pieces 132. The coil 136 is adapted to receive electric current and is configured, upon receipt of the electric current, to generate a magnetic force that causes the armature 134 to rotate and thereby move the flapper element 148. For example, as depicted in FIGS. 2 and 3, depending upon the direction of the supplied electric current flow, the coil 136 will generate a magnetic force that causes the armature to rotate in either a clockwise direction or a counter clockwise direction (from the perspective of FIGS. 2 and 3) to thereby place the housing outlet 112 in fluid communication with the first nozzle outlet 124 or the second nozzle outlet 128, respectively.

As the coil 136 is disposed external to the magnetic pole pieces 132, it can be larger than the coils that are used in presently known torque motor valve actuators without increasing the size of components that are typically mounted around the coil, such as the magnetic pole pieces. As a result, relatively larger wire may be used, reducing coil resistance. The coil 136 is also preferably formed of suitable wire and using winding techniques that allow it to withstand relatively high temperatures. For example, it may withstand temperatures greater than about 260° C. Some examples of suitable wire, such as anodized aluminum embedded in electrically insulative, high thermal expansion ceramic, and suitable winding techniques are disclosed in U.S. Pat. No. 8,572,838, the entirety of which is incorporated herein by reference.

In the embodiments depicted in FIGS. 1 and 2, the torque motor valve actuator 104 includes only a single coil 136. It will be appreciated, however, that the torque motor valve actuator 104 may also be implemented with two or more coils. In these embodiments, one of the coils may be implemented as a back-up in the event the primary coil becomes inoperative.

From the foregoing, it is to be appreciated that the armature assembly according to exemplary embodiments of the present invention achieves a low armature torsional rate (i.e., a spring rate) at high temperatures while also being able to withstand high vibration environments. The geometry of the armature spring is optimized to achieve a functional stiffness (i.e., spring rate (Ka)) of about 200 inches-pounds/rad (200 in-lb/rad), a functional stress below 29 ksi, and frequencies above 2000 Hertz (Hz) (or as high as possible) for all modes, except the primary torsional mode.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An armature spring configured to be coupled to and bias an armature of a torque motor valve actuator to a null position, the armature spring comprising:
   a rigid central portion;
   opposed end portions; and
   a flexible portion intermediate the rigid central portion and each end portion, the rigid central portion, the opposed end portions, and the flexible portions defining a variable cross section torsion bar with the flexible portions comprising reduced cross-sectional portions of the torsion bar relative to the rigid central portion and opposed end portions,
   wherein the armature includes a first end, a second end, and a bore that extends generally transversely through the armature and the rigid central portion of the armature spring extends through the bore.

2. The armature spring of claim 1, wherein the torsion bar has a selected torsion bar length (Lt) and cross section for a predetermined functional stress.

3. The armature spring of claim 1, wherein the rigid central portion is adjustable in length and cross section to obtain a selected resonance frequency for all modes above a primary torsional frequency.

4. The armature spring of claim 1, wherein the armature is rotationally mounted within an actuator housing of the torque motor valve actuator, the torque motor valve actuator further comprising:
   a first magnetic pole piece of a first magnetic polarity mounted within the actuator housing;
   a second magnetic pole piece of a second magnetic polarity mounted within the actuator housing, the second magnetic pole piece spaced apart from the first magnetic pole piece to define a gap in which the rotationally mounted armature is disposed; and
   a coil mounted within the actuator housing and surrounding at least a portion of the armature, the coil disposed such that it is not surrounded by either the first magnetic pole piece or the second magnetic pole piece, the coil adapted to receive electric current and configured, upon receipt thereof, to generate a magnetic force that causes the armature to rotate.

5. The armature spring of claim 4, wherein the opposed end portions are each respectively fixedly coupled to the actuator housing.

6. The armature spring of claim 1, wherein a length and cross section of each flexible portion are selectively determined to result in a predetermined functional stress and a predetermined functional stiffness.

7. The armature spring of claim 1, wherein each flexible portion has a substantially rectangular cross-section.

8. An armature assembly for a torque motor valve actuator including an actuator housing, the armature assembly comprising:
an armature that defines a bore; and
an armature spring coupled to and extending substantially perpendicularly through the bore of the armature and configured to bias the armature to a null position in the torque motor valve actuator, the armature spring comprising a torsion bar having a variable cross-section defined by a rigid central portion, opposed end portions, and a flexible portion intermediate the rigid central portion and each end portion, the flexible portions comprising reduced cross-sectional portions of the torsion bar and the rigid central portion extends through the bore of the armature.

9. The armature assembly of claim 8, wherein:
the armature includes a first end, a second end, and the bore that extends generally transversely through the armature.

10. The armature assembly of claim 8, wherein the torsion bar has a selected torsion bar length (Lt) and cross section for a predetermined functional stress.

11. The armature assembly of claim 8, wherein the rigid central portion is adjustable in length and cross-section to obtain a selected resonance frequency for all modes above a primary torsional frequency.

12. The armature assembly of claim 8, wherein the armature is rotationally mounted within the actuator housing of the torque motor valve actuator, the torque motor valve actuator further comprising:
a first magnetic pole piece of a first magnetic polarity mounted within the actuator housing;
a second magnetic pole piece of a second magnetic polarity mounted within the actuator housing, the second magnetic pole piece spaced apart from the first magnetic pole piece to define a gap in which the rotationally mounted armature is disposed; and
a coil mounted within the actuator housing and surrounding at least a portion of the armature, the coil disposed such that it is not surrounded by either the first magnetic pole piece or the second magnetic pole piece, the coil adapted to receive electric current and configured, upon receipt thereof, to generate a magnetic force that causes the armature to rotate.

13. The armature assembly of claim 12, wherein the opposed end portions are each respectively fixedly coupled to the actuator housing.

14. The armature assembly of claim 8, wherein a length and cross section of each flexible portion are selectively determined to result in a predetermined functional stress and a predetermined functional stiffness.

15. The armature assembly of claim 8, wherein each flexible portion has a substantially rectangular cross-section.

16. A torque motor valve actuator, comprising:
a first magnetic pole piece of a first magnetic polarity;
a second magnetic pole piece of a second magnetic polarity, the second magnetic pole piece spaced apart from the first magnetic pole piece to define a gap;
an armature assembly comprising:
a rotationally mounted armature disposed in the gap between the first and second magnetic pole pieces, the armature defining a bore; and
an armature spring coupled to and extending substantially perpendicularly through the bore of the armature and configured to bias the armature to a null position, the armature spring comprising a torsion bar having a variable cross-section defined by a rigid central portion, opposed end portions, and a flexible portion intermediate the rigid central portion and each end portion, the flexible portions comprising reduced cross-sectional portions of the torsion bar and the rigid central portion extends through the bore; and
a coil surrounding at least a portion of the armature and adapted to receive electric current and configured, upon receipt thereof, to generate a magnetic force that causes the armature to rotate.

17. The torque motor valve actuator of claim 16, wherein the torque motor valve actuator further comprises an actuator housing and the first magnetic pole piece, the second magnetic pole piece, the armature assembly, and the coil are each mounted within the actuator housing, the coil disposed such that it is not surrounded by either the first magnetic pole piece or the second magnetic pole, the torque motor valve actuator included in a valve assembly, the valve assembly comprising:
a valve housing;
a first nozzle disposed within the valve housing;
a second nozzle disposed within the valve housing and spaced apart from the first nozzle;
a flapper element disposed between the first and second nozzles and coupled to an end of the armature, wherein the torque motor valve actuator is coupled to the valve housing and is configured to move the flapper element to selectively engage at least one of the first or second nozzles, wherein rotation of the armature moves the flapper element.

18. The torque motor valve actuator of claim 16, wherein:
the armature includes a first end, a second end, and the bore that extends generally transversely through substantially the center of the armature.

19. The torque motor valve actuator of claim 16, wherein:
the torsion bar has a selected torsion bar length (Lt) and cross-section for a desired functional stress;
the shape and size of the cross-section of the rigid central portion is adjustable to obtain a desired resonance frequency for all modes above a primary modal frequency; and
a length and cross section of each flexible portion is selectively determined to result in a predetermined functional stress and a predetermined functional stiffness.

* * * * *